United States Patent [19]

Haldipur et al.

[11] Patent Number: 5,143,530

[45] Date of Patent: Sep. 1, 1992

[54] FILTERING APPARATUS

[75] Inventors: Gaurang B. Haldipur, Monroeville; William J. Dilmore, Murrysville, both of Pa.

[73] Assignee: Westinghouse Electric Corp., Pittsburgh, Pa.

[21] Appl. No.: 600,953

[22] Filed: Oct. 22, 1990

[51] Int. Cl.$^5$ .............................................. B01D 46/00
[52] U.S. Cl. .................................... 55/341.1; 55/302; 55/337; 55/378
[58] Field of Search .............. 55/237, 267, 341.1, 55/378, 302, 378

[56] References Cited

U.S. PATENT DOCUMENTS

| | | | |
|---|---|---|---|
| 4,525,184 | 6/1985 | Tassicker | 55/302 |
| 4,680,038 | 7/1987 | Titus | 55/302 |
| 4,904,287 | 2/1990 | Lippert et al. | 55/302 |

FOREIGN PATENT DOCUMENTS

1407941 5/1978 Fed. Rep. of Germany ........ 55/302

Primary Examiner—Bernard Nozick

[57] ABSTRACT

A vertical vessel having a lower inlet and an upper outlet enclosure separated by a main horizontal tube sheet. The inlet enclosure receives the flue gas from a boiler of a power system and the outlet enclosure supplies cleaned gas to the turbines. The inlet enclosure contains a plurality of particulate-removing clusters, each having a plurality of filter units. Each filter unit includes a filter clean-gas chamber defined by a plate and a perforated auxiliary tube sheet with filter tubes suspended from each tube sheet and a tube connected to each chamber for passing cleaned gas to the outlet enclosure. The clusters are suspended from the main tube sheet with their filter units extending vertically and the filter tubes passing through the tube sheet and opening in the outlet enclosure. The flue gas is circulated about the outside surfaces of the filter tubes and the particulate is absorbed in the pores of the filter tubes. Pulses to clean the filter tubes are passed through their inner holes through tubes free of bends which are aligned with the tubes that pass the clean gas.

17 Claims, 7 Drawing Sheets

FILTERING APPARATUS

The Government of the United States of America has rights in this invention pursuant to Contract No. DE-FC21-89-MC 26042, awarded by the U.S. Department of Energy.

BACKGROUND OF THE INVENTION

This invention relates to filtering apparatus for separating solid or liquid (aerosols) particulate from carrier fluids such as the flue gas streams derived from combustion or gasification and other like processes. This invention has particular relationship to the separation of particulate from high temperature gas streams which develop high pressure such as the gas streams from pressurized fluid-bed combustions and pressurized coal gasifiers, particularly in power generation.

In the following description, this invention will be related to electrical power generators in the interest of dealing with a concrete adaptation to aid those skilled in the art in understanding this invention. But it is to be understood that adaptation of the principles of this invention to apparatus of any other type is within the scope of equivalents thereof.

In electrical power generation, the boilers supply the driving fluid which is usually flue gas heated by coal and limestone to a temperature of 1600° F. (871.12° C.) to 2000° F. (1092° C.). The flue gas is filtered to separate particulate and the filtered gas drives the gas turbines. There is an extended discussion of the filtering of high temperature combustion gases in U.S. Pat. No. 4,764,190, Israelson et al. (herein Israelson).

This invention concerns itself with filtering apparatus in power plants and other facilities such as industrial and municipal incinerators in which the separation of particulate is effected by ceramic, so-called "candle filters". The so-called "candle filters" are hollow ceramic porous filter tubes and will be sometimes referred to in this application as filter tubes. "Candle filters" are currently available from such organizations as Schumacher of Crailsheim, West Germany, Didier, Eisenberg, West Germany, Refracton, Rochester, N.Y. and Coors Golden, Colo., USA. A typical "candle filter" is 2.36 inches (60 mm) in outside diameter and 1.57 inches (40 mm) inside diameter below the head and up to 4.92 feet (1.5) meters) in length. The gas to be cleaned flows across the outside of the filter and the cleaned gas flows through the inside of the filter. The bottom of the "candle filter" is sealed.

Heretofore "candle filters" have been predominantly commercialized for low temperature and smaller scale applications. A high temperature application is taught by Israelson who uses a vessel 8.4 feet (2.56M) inside diameter and 29 feet (8.84M) in length. The filter tubes or "candle filters" are suspended from a tube sheet of 7.5 feet (2.29M). There are 130 filter tubes. While Israelson's teaching is satisfactory for smaller scale applications, its adaptation to large scale application, where a large number of filter tubes are demanded, would require a vessel of very large diameter.

It is an object of this invention to provide filtering apparatus using "candle filters" without a filtering vessel of excessively large diameter for large scale applications.

U.S. Pat. No. 4,525,184, Tassicker, discloses filtering apparatus including a plurality of arrays of filter tubes suspended vertically from a central supporting tube in which the gas to be cleaned is introduced laterally or through the top of the vessel and which conducts the processed gas axially to an outlet respectively at the top or bottom of the vessel. With the filter-tube arrays mounted vertically, a large number of filter tubes may be mounted in a vessel whose diameter is not excessively large.

There is also what appears to be an adaptation of Tassicker's teaching in which there are two arrays of filter tubes extending from a tube sheet secured to a central supporting tubular member. In this case, the inlet is in the top of the vessel and the cleaned gas flows through the central tubular member to a bottom outlet. In this adaptation, the vessel is 26 feet (7.92M) in diameter and 66 feet (20.12M) in length.

Tassicker and its adaptation have a number of drawbacks. In both cases the tube sheets which carry the arrays of filter tubes are of large surface area and subjected to high stresses by the numerous filter tubes which they carry and are, at the same time, weakened by the holes in which the numerous filter tubes are secured. At the temperatures within the vessel of 1600° F. (871.12° C.) to 2000° F. (1092° C.), stress resistance of the tube sheet is low. Because the tube sheets are large, the bending stresses are high. Tube sheets of high thickness are required. To support the tube sheets, a central tubular member of substantial thickness is required. This member has a high thermal conductivity which can lead to flow of excessive heat to the joint between this central tubular member and the vessel and failure of the seal at the joint. Failure may also result from differential thermal expansion under the high loads.

In a filtering apparatus in which the "candle filters" are used, the "candle filters" are cleaned by pulses of relatively cold gas transmitted through the holes in the candle filters. In Tassicker, as well as its adaptation, the pulses flow into the filter tubes through nozzles which extend from and are fed by branches of tubes with right-angle bends. The pulse supply tubes are subjected, at their bends, to high stresses because of the differential thermal expansion between the insides of the tubes which are cooled by the pulses and the outsides of the tubes which are at the high temperature within the vessel. The pulse tubes are subject to fatigue because of the repeated pulsing and the possibility of damage from fatigue is exascerbated by the high stress. In addition, since the thermal expansion of the branches carrying the nozzles differs from the thermal expansion of the tube sheet from which the filter tubes are suspended, the nozzles may become displaced from the filter tubes through which the pulses are to flow.

In Tassicker and its adaptation, some of the particulate in the circulating gas and some of the particulate blown out from the pores of the "candle filters" by the cleaning pulses falls on the hoods of the filter assemblies. Each hood extends from the outer rim of a tube sheet from which the filter tubes are suspended. Since the tube sheet has a large diameter, the angle of the hoods to the horizontal is relatively small and is less than the angle of internal friction of the particles on the hood, which is between 45° and 60°. The particulate deposited on the hoods tend to remain on the hood. Tassicker's tapered hoods include vibrators to dislodge this particulate. The reliability of these vibrators at high temperature conditions is questionable and the vibration damage to the ceramic filter tubes may cause serious functional failures.

It is an object of this invention to overcome the above-described disadvantages and drawbacks of the prior art and to provide filtering apparatus using "candle filters" for separating particulate from a gas stream with a vessel of moderate transverse cross-sectional area (diameter) in whose use the stress on the tube sheet supporting the filters as well as on the tubes supplying filter cleaning pulses and the effects of differential thermal expansion shall be minimized. It is also an object of this invention to provide such filtering apparatus which shall lend itself to the provisions of particle deflecting surface (hoods) which shall be inclined at an angle greater than the angle of internal friction for the particulate.

SUMMARY OF THE INVENTION

In accordance with this invention, there is provided apparatus for filtering particulate from a gas stream having a vessel of moderate dimensions in which a large number of candle filters or filter tubes are mounted. At the heart of this invention is a modular assembly of vertically spaced filter units of relatively small dimensions. Each module is herein referred to as a cluster. Each filter unit includes a filter clean-gas chamber formed between a flat plate and a tube sheet. An array of filter tubes is suspended from each tube sheet in communication with each filter clean-gas chamber. The filter units are formed into the cluster, typically by tubular joining members secured by welding or other means between the tube sheet of a filter clean-gas chamber of one filter unit and the plate of the filter clean-gas chamber of the next filter unit in the succession. A significant feature of this invention are tubes extending from each filter chamber through the cluster, i.e., through the tubular members and the filter clean-gas chambers of any other filter units in the succession. These tubes serve to conduct the clean gas resulting from the processing by the cluster of the gas stream containing the particulate.

In accordance with this invention, a plurality of clusters are mounted in a vessel suspended vertically from a tube sheet extending horizontally across the vessel. This tube sheet is called herein "main tube sheet"; the tube sheets from which the filter tubes are suspended are called "auxiliary tube sheets". Typically, each cluster is suspended from a tubular member secured to the plate of the filter chamber of the upper filter unit and by a flange to the main tube sheet. The main tube sheet divides the vessel into an inlet enclosure, having inlet means through which the flue gas stream from the boiler containing the particulate is admitted, and an outlet enclosure having outlet means through which the processed gas is transmitted to the turbines. The expression "processed gas" means gas which has been treated to remove the particulate and is used herein in preference to "clean gas" to avoid any dispute as to whether every particle has been removed from the clean gas. The gas containing the particulate, typically the flue gas produced by a boiler, is driven into the inlet enclosure by a compressor. The tubes carrying the processed gas from the filter clean-gas chambers extend linearly through the cluster and open through the main tube sheet into the outlet enclosure. A shroud or baffle is provided in the vessel for guiding the inlet gas stream to the region between the clusters where it circulates in intimate contact with the external surfaces of the filter tubes. The gas in the inlet enclosure is typically under pressure of about 10 atmospheres. The filter tubes are porous so that the particulate from the gas stream penetrates into their surfaces. The clean or processed gas sans the particulate penetrates into the inside of the filter tubes and flows into the outlet enclosure and through an outlet nozzle to the turbines.

In the practice of this invention, pulses for cleaning the filter tubes are supplied by linear conductors which are mounted in the outlet enclosure. There is a conductor for each tube which conducts the processed (cleaned) gas and each conductor is mounted coaxially with its associated tube. The pulses supplied through the cleaning conductors pass into the holes in the filter tubes through the filter clean-gas chambers and dislodge the particulate trapped in the pores of the filter tubes. The cleaning pulses are cold. Since there are no bends in the conductors which carry the pulses, stresses developed at bends are precluded. Since the linear conductors are centered coaxially along the tubes which carry the processed gas, displacement of the pulse outlets relative to these tubes is avoided.

The apparatus according to this invention also surmounts other deficiencies of Tassicker and of other prior art. The weakening of the main tube sheet of this invention by perforations for supporting the clusters is minimized. The number of perforations is equal not to the large number of filter tubes but to the number of clusters each of which includes a large number of filter tubes. Where there are only three clusters, there are only three perforations in the main tube sheet for supporting the clusters. Typically, the supporting tubular members are each only about 20 inches (0.51M) in diameter. The auxiliary tube sheets used in the practice of this invention, except the lowest tube sheet, supports less than one-third of the number of filter tubes per cluster, the lowest one a few more. These tube sheets may be of relatively small diameter. This invention dispenses with the thick main tube sheets and with the thick tubular member for supporting the numerous filter tubes and the thick tube sheets.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which.

DETAILED DESCRIPTION OF EMBODIMENT

FIGS. 1 through 17 show filtering apparatus 31 for separating particulate from a gas stream. This apparatus includes a vessel 34 in which there are mounted a plurality of clusters 40, each cluster including a plurality of filter units 43, 46, 49 mounted vertically with 43, the uppermost unit, and 49, the lowermost unit. The units 43 and 46 include an array 50 and the unit 49 including an array 51 of "candle filters" or filtering tubes 52.

The vessel 34 has a dome-shaped head 55 and a body 58. The head 55 terminates in a linear tip, defining an exit opening or nozzle 61 for the gas processed in the vessel; the body 58 includes an upper part 64 of generally circular cylindrical shape joined by a frustro conical lower part 67 for receiving the particulate, terminating in a linear tip defining an opening or nozzle 70 connected to a hopper (not shown) for the separated particulate. From the head 55, a plurality of ports 73 (FIG. 2) and 76 equally spaced circumferentially extend. The ports 73 serve for inserting process instrumentation and for viewing the interior of the head during shut-down periods. Through each port 76, three tubes 78 for supplying the pulses for cleaning the filter tubes 52 are sealed. The tubes 78 are guided in a bracket 80 (FIG. 1) to suppress whipping and assure concentricity.

The head 55 (FIG. 1) is composed of an internal layer 81 of thermal insulation covered by an external shell 82 of metal, typically carbon steel. The layer 81 is tapered at its lower or inner end. At its lower end, the shell 82 is joined by a flange 85 for connection to the body 58. Within the layer 81, there is a heat radiation shield 88. Along its outer external surface, the radiation shield 88 is seated along the internal surface of the layer 81 and along its internal surface, it is circularly cylindrical. A resilient web 91 extends into the radiation shield 88. The web 91 is in the form of a ring whose cross section around the periphery is angular with the apex extending into the radiation shield. The web 91 terminates externally at its lower end in a seal ring 94. Within the web 91, there is fiber thermal insulation 97. A tube sheet 100, which is herein called the "main tube sheet", is joined to the inner end of the web 91. The web 91 serves as a thermal expansion joint for the tube sheet 100. Typically, the web 91 and tube sheet 100 are composed of RA 333, Inconal 617 or Hynes 556 superalloy.

Figure 1:
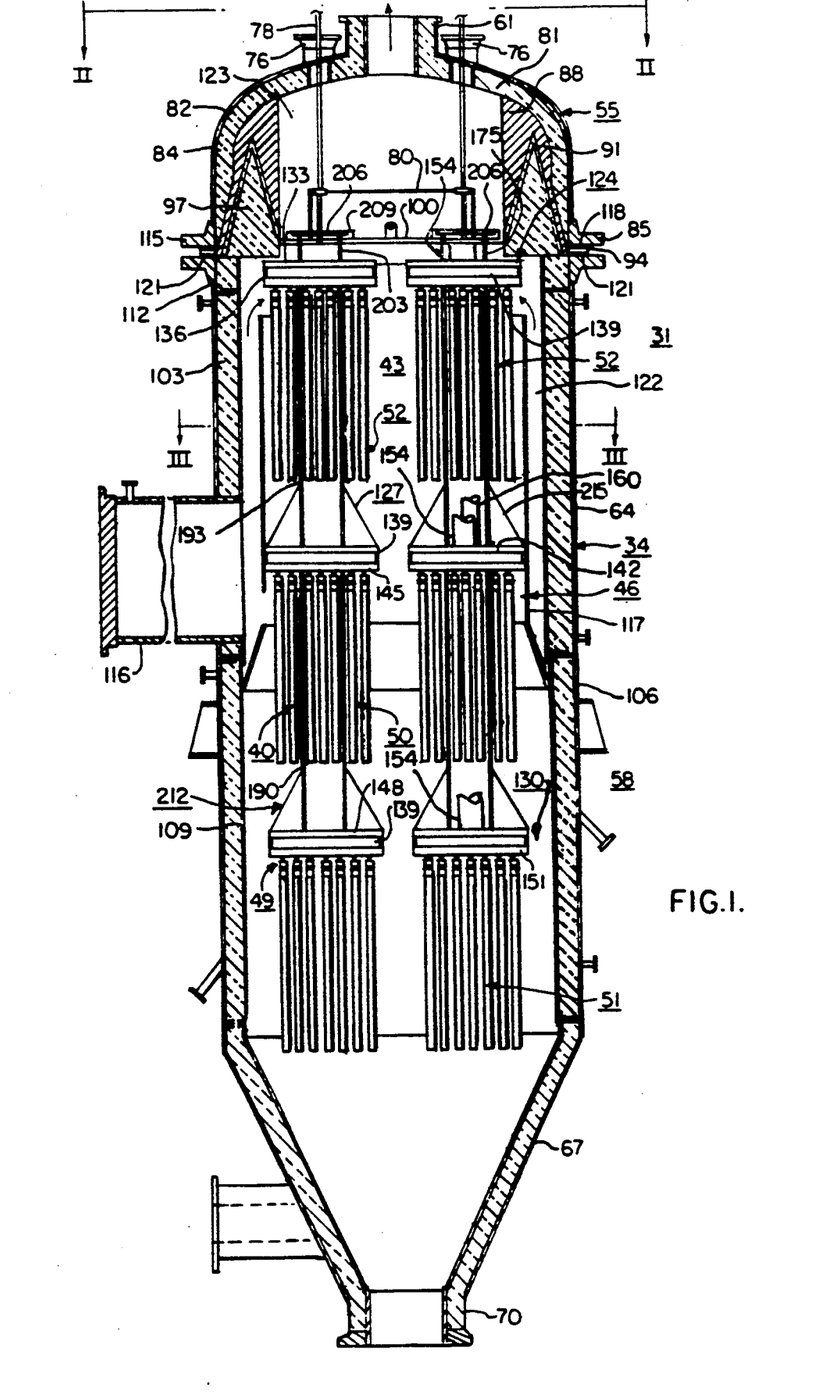
FIG. 1 is a view generally in longitudinal section with the internal structure shown in side elevation of an embodiment of this invention.
Figure 2:
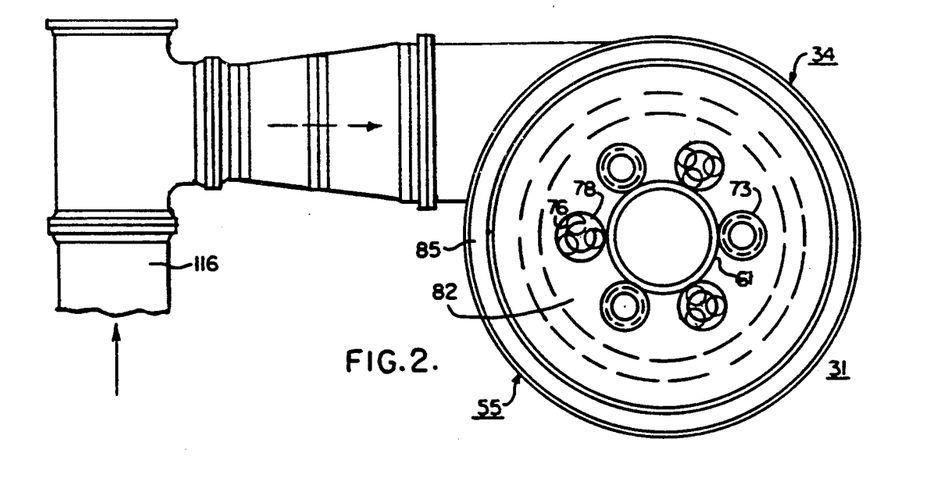
FIG. 2 is a plan view taken in the direction II—II of FIG. 1 but displaced circumferentially 30° counterclockwise with respect to FIG. 1.
Figure 3:
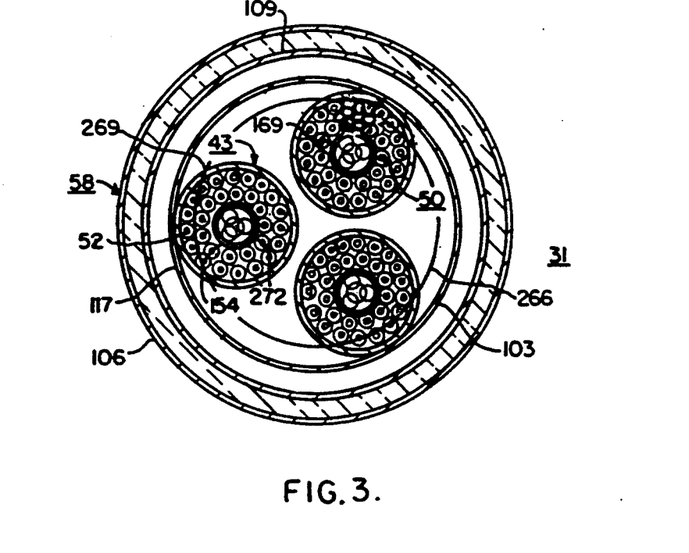
FIG. 3 is a view in transverse section taken along line III—III of FIG. 1 but displaced circumferentially 30° counterclockwise with respect to FIG. 1.

The body 58 includes a layer 103 of fiber thermal insulation enclosed in an external shell 106 and having a liner 109 on the inside, both the shell 106 and the liner 109 typically being composed of carbon steel. The liner 109 is supported from the shell 106 by an annular bracket 112. At the top, a flange 115 is joined to the shell 106. The body 58 has an inlet nozzle 116 for receiving the gas whose particulate is to be separated, typically the flue gas from the boiler. The nozzle 116 opens into the body. The gas from the nozzle is directed upwardly by a shroud or deflector 117, having an upper part of circularly cylindrical shape tapering at the bottom outwardly in frustroconical shape and joined there to the liner 109. In assembling the vessel 34, the flanges 85 and 115 are bolted together (bolts not shown), compressing between them the seal ring 94 and annular gaskets 118 and 121 interposed respectively between the flange 85 and the seal ring 94 and between the seal ring 94 and the flange 115. The vessel 34 is sealed gas tight. The gas is driven through the vessel typically by a compressor (not shown) associated with the boiler. In the vessel the typical pressure of the gas is about 10 atmospheres and the temperature is 1600° F. (871.12° C.) to 2000° F. (1092° C.). The tube sheet 100 divides the vessel into an inlet enclosure 122 defined by the body 58 and an outlet enclosure 123 defined by the head.

The filter units 43, 46, 49 (FIG. 4) of each cluster 40 includes filter clean-gas chambers 124, 127 and 130 (FIGS. 11-16) respectively. Each chamber 124 consists of a plate 133, a tube sheet 136, and a ring 139; each chamber 127 consists of a plate 142, a tube sheet 145 and a ring 139; each chamber 130 consists of a plate 148, a tube sheet 151 and ring 139. The tube sheets 136, 145 and 151 are herein referred to as "auxiliary tube sheets". The ring 139 of chamber 124 is welded to the plate 133 and the tube sheet 136 at their peripheries; the ring 139 of chamber 127 is welded to the plate 142 and tube sheet 145 at their peripheries; the ring 139 of chamber 130 is welded to plate 148 and tube sheet 151 at their peripheries. In each case the welds form a gas-tight seal.

A tube 154 (FIG. 10) is welded to the rim of a circular opening 157 (FIG. 11) in the plate 148 of the lowermost filter clean-gas chamber 130 of each cluster 40. This tube 154 is in communication with chamber 130. A tube 160 (FIG. 9) is welded to the rim of a circular opening 163 (FIG. 13) in the plate 142 of the middle filter clean-gas chamber 127. A tube 175 (FIG. 8) is welded to the rim of a circular opening 178 (FIG. 15) in the plate 133 of the uppermost filter clean-gas chamber 124. Tube 154 extending from the lowermost chamber 130 is supported by sleeve 181 (FIGS. 14, 17), extending through middle chamber 127 and sleeve 182, extending through the uppermost chamber 124. Tube 160 extending from the middle chamber 127 is supported by sleeve 184, extending through the uppermost chamber 124. The sleeve 181 is welded to the rims of circular openings in the plate 142 and the tube sheet 145 of the middle chamber 127; sleeve 182 is welded to the rims of circular openings in the plate 133 and tube sheet 136 of the uppermost chamber 124; sleeve 184 is also welded to the rims of circular openings in the plate 133 and tube sheet 136 of the upper filter chamber 124. The sleeves 181, 182 and 184 extend through the chamber 127 and 124 and their ends are flush with the outer surfaces respectively of the tube sheet 145 and the plate 142 of the middle chamber 127 and of the tube sheet 136 and the plate 133 of the uppermost chamber 124.

The tube 154 is of substantially larger diameter than the tubes 160 and 175. Typically, tube 154 has a diameter of 8 inches (20.3 cm) and tubes 160 and 175 have a diameter of 6 inches (15.2 cm). Typically, the sleeves 181 and 182 have a diameter of 9 inches (22.9 cm) and sleeve 184 a diameter of 7 inches (17.8 cm). Sleeves 181 and 182 support tube 154 which extends from the lowermost chamber 130 and sleeve 184 supports the tube 160 which extends from the middle chamber.

The filter tubes 52 of arrays 50 are suspended from tube sheets 136 and 145. The filter tubes of array 51 are suspended from tube sheet 151. Filter unit 43 includes chamber 124, tube 175 and array 50 suspended from tube sheet 136; filter unit 46 includes chamber 127, tube 160 and array 50 suspended from tube sheet 145; filter unit 49 includes chamber 130, tube 154 and array 51.

The filter units 43, 46, 49 are integrated into a structural unit (FIG. 4) by tubular members 190 and 193. Tubular member 190 is welded centrally (coaxially) at its lower end by external filet welds 191 to the plate 148 of filter chamber 130 and at its upper end to the tube sheet 145 of chamber 127. Tubular member 193 is welded centrally (coaxially) at its lower end by external filet welds 192 to plate 142 of filter chamber 127 and at its upper end to tube sheet 136 of filter chamber 124. Each cluster 40 is suspended from a flanged tubular member 203 (FIGS. 1 and 4), which is welded centrally (coaxially) by an external filet weld 204 to the plate 133 of chamber 124, passes through an opening in the main tube sheet 100 and is joined gas tight to the main tube sheet by the flange 206 on the tubular member 203. The flange 206 is seated in a groove of a ring 209 (FIG. 1) that engages the tube sheet 100. The tubes 154, 160, 175 (FIG. 4) and the sleeves 181 (FIGS. 13, 17) and 182 (FIG. 15) and 184 (FIG. 16) extend within the tubular members 190, 193 and 203. The tube 154 extends from the plate 148 through the tubular member 190, 193 and 203 and the sleeves 181 and 182 and the main tube sheet 100 opening into the region of the head above the main tube sheet. The tube 160 extends from the plate 142, through the tubular member 193 and the sleeve 184 and the main tube sheet opening in the same region of the head. The tube 175 extends through the tube sheet 100 opening into the region of the head above the tube sheet.

Hoods or particle-deflector assemblies 212 are mounted above each plate 142 and 148 of the middle and lowermost filter units 127, 130. Each assembly includes a particle-deflector hood 215 of generally frustro-conical shape suspended above the associated plate by a sleeve 218 (FIG. 4), which engages the corresponding tubular member 190 or 193. Each hood 215 is typically at an angle of about 70° to the horizontal. This angle exceeds the angle of internal friction for the particulate. It is emphasized that, because there are a number of clusters 40 and the corresponding diameters of the plates defining the filter chambers 127 and 130 are relatively small, the angle of the deflectors can be relatively large.

Typically there are two rings 266 and 269 (FIGS. 1, 6, 7) of filter tubes 52 in each array 50, the inner ring 266 of 16 tubes and outer ring 269 of 22. Array 51 has a ring 272 (FIGS. 1, 5) of 10 rods within the inner ring 269 and 4 tubes in the center within the ring 272. Typically, there are in each cluster 40, 38 tubes each in arrays 50 and 52 tubes in array 51. Each cluster 40 typically suspends 128 filter tubes 52 and the three clusters suspend a total of 384 tubes. Within the scope of this invention, other arrangements and numbers of filter tubes are comprehended.

The components within the vessel, except the filter tubes 52, including the main tube sheet 100, the shroud or deflector 117, the plates 133, 142, 148, the rings 139, the auxiliary tube sheets 136, 145, 151, the tubular members 190, 193, the flanged tubular member 203, are composed of 310 stainless steel as are the tubes 78 which supply the cleaning pulses.

In apparatus such as is shown in FIG. 1 with three clusters 40, the main tube sheet 100 has a diameter typically of 76 inches (1.93M), the auxiliary tube sheets 136, 145, 151 of 38 inches (0.97M) and the flanged tubular member 203 a diameter of 20 inches (5.1M). The area of the main tube sheet occupied by the three supports for the clusters 40 is only about 20% of the total area of the main tube sheet. The tube sheet 100 is not materially weakened.

Figure 18:
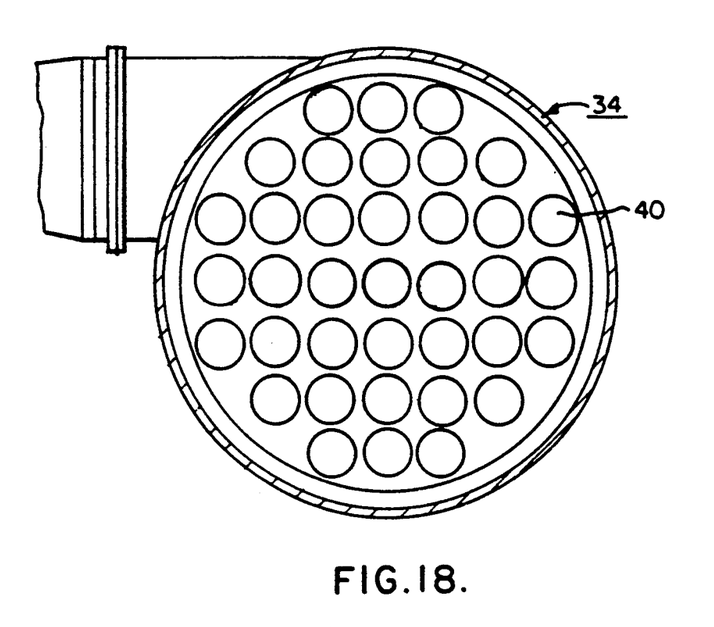
FIG. 18 is a diagrammatic view showing an array of clusters including a large number of filter tubes which may be used in the practice of this invention.

A typical embodiment of Tassicker's teaching includes a vessel 26 feet in diameter by 66 feet long containing 4,370 filter tubes. There are two tube sheets with 2,185 filter tubes suspended from each tube sheet. In an adaptation of this invention, an octagonal array 275 of 3, 5, 7, 7, 7, 5, 3, clusters 40 as shown in FIG. 18 can be used. This array has 36 clusters with 128 filter tubes 52 in each cluster and would contain 4,608 filter tubes. The transverse length of this array, assuming that the auxiliary tube sheets have a diameter of 38 inches (0.97M), would be 266 inches or 22 feet (6.79M) which leaves 4 feet (1.22M) for the shroud 117 and the walls of the vessel. Typical overall length of the vessel 34 containing three clusters 40 is 479.50 inches or 40 feet (12.18M). The overall length of a vessel for 35 clusters may be the same.

In the use of this invention, the flue gas entering nozzle 116 is deflected upwardly by shroud 117 and then downwardly by structure including the main tube sheet 100 extending over the top of the body 58 of vessel 34. The gas flows over the outer surfaces of filter tubes. The particulate is absorbed in the pores of the filter tubes. Typically, each filter tube 52 as stated has a diameter of approximately 2.36 inches (6 cm) and a length of 4.92 feet (1.5M). The effective absorption area is $11 \times 2.36/12 \times 4.92 = 3.04$ square feet (0.28 sq. M).

Figure 4:
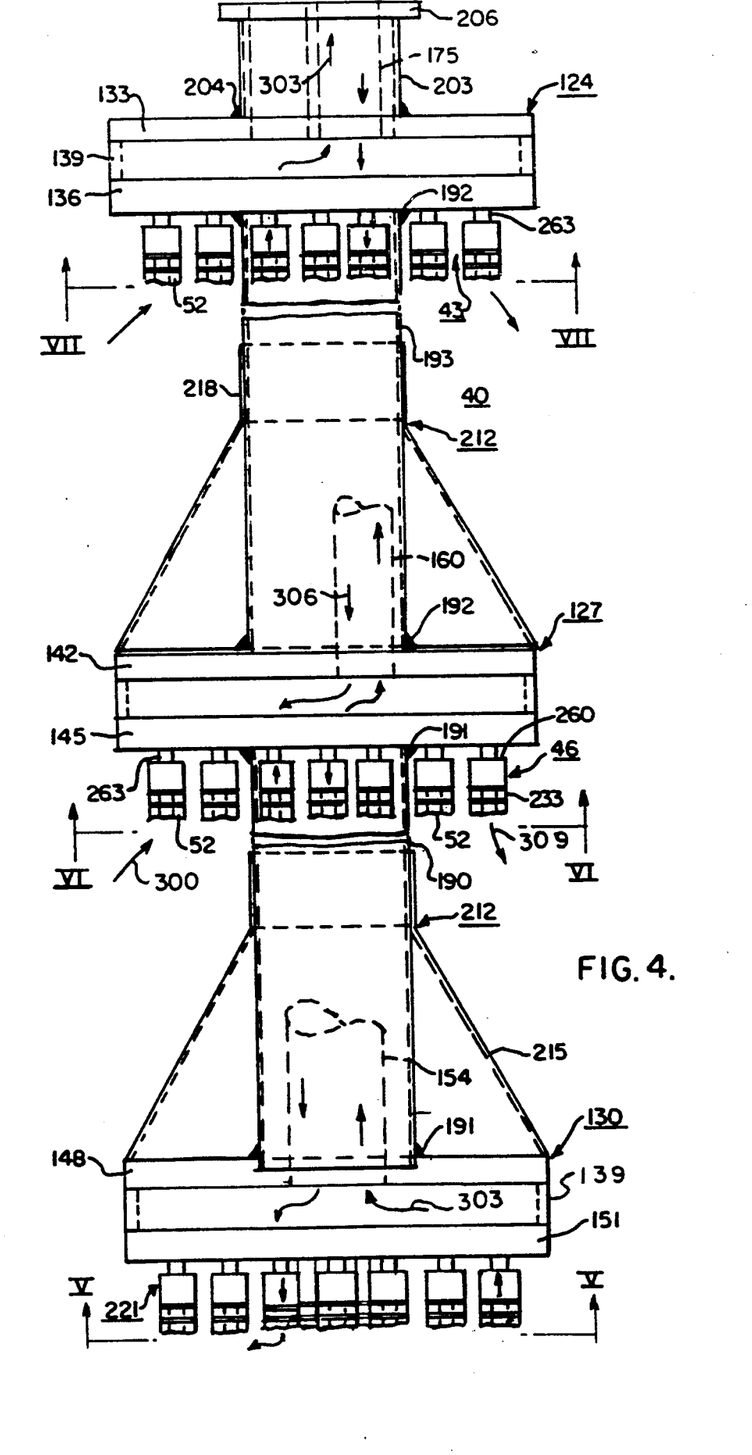
FIG. 4 is a view in side elevation of a cluster in accordance with this invention with only the upper parts of the filter tube assemblies shown and the tubes conducting the processed gas outwardly and the cleaning pulses inwardly in broken lines in the interest of clarity.
Figure 5:
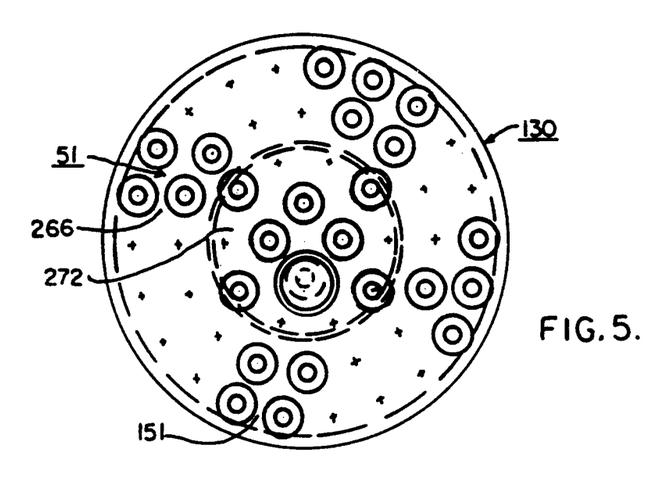
FIGS. 5, 6, 7 are views in transverse section taken along lines V—V, VI—VI and VII—VII, respectively, of FIG. 4 assuming that full length filter tubes are extending from the auxiliary tube sheets.
Figure 6:
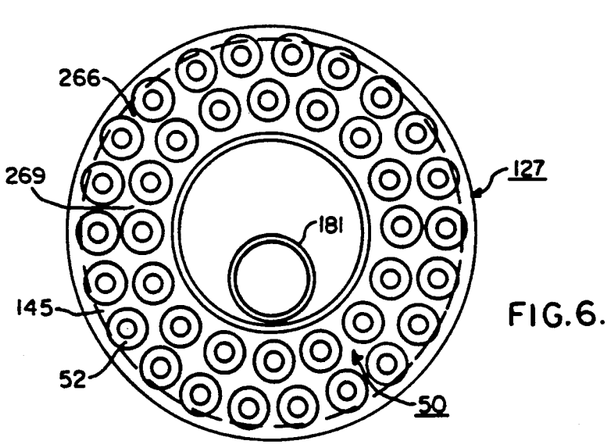
Figure 7:
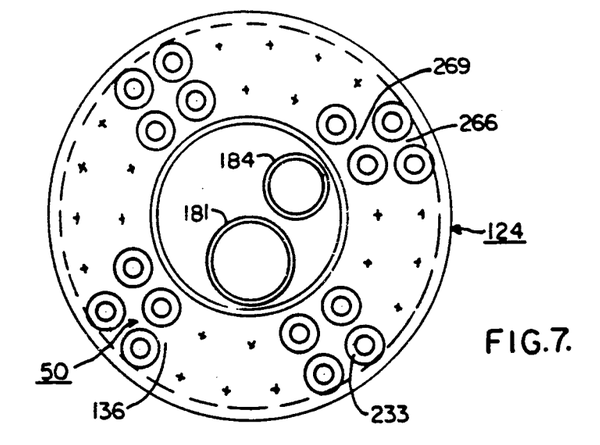
Figure 8:
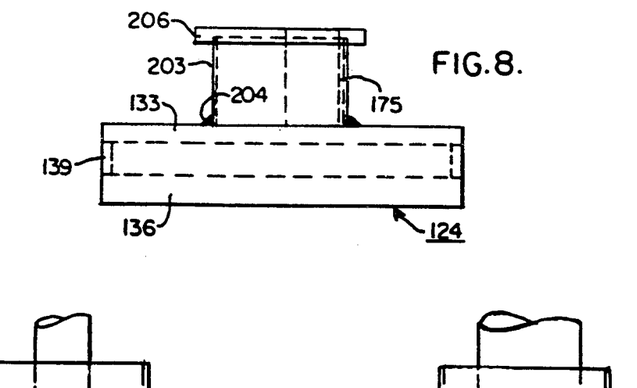
FIG. 8 is a fragmental view in side elevation showing the upper filter unit of the cluster shown in FIGS. 1 and 4 and its supporting structure.
Figure 9:
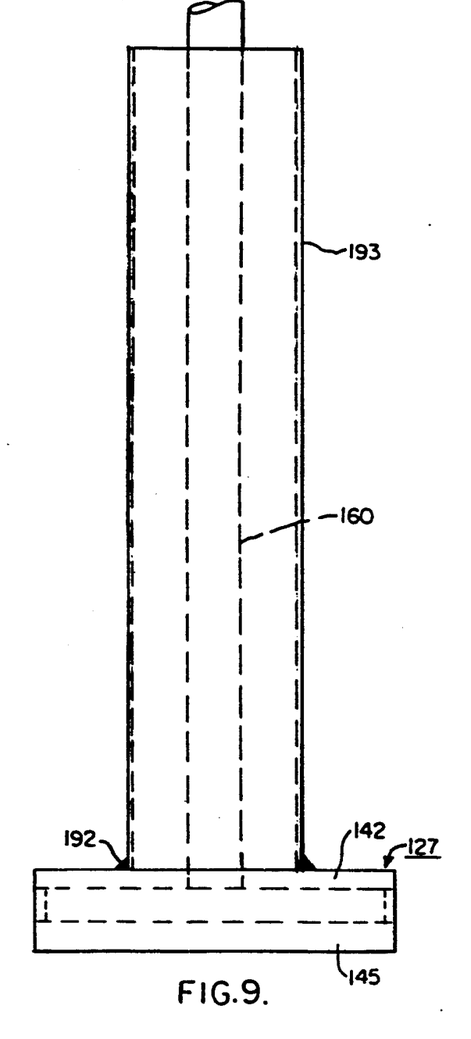
FIG. 9 is a like fragmental view in side elevation showing the central filter unit and its supporting structure.
Figure 10:
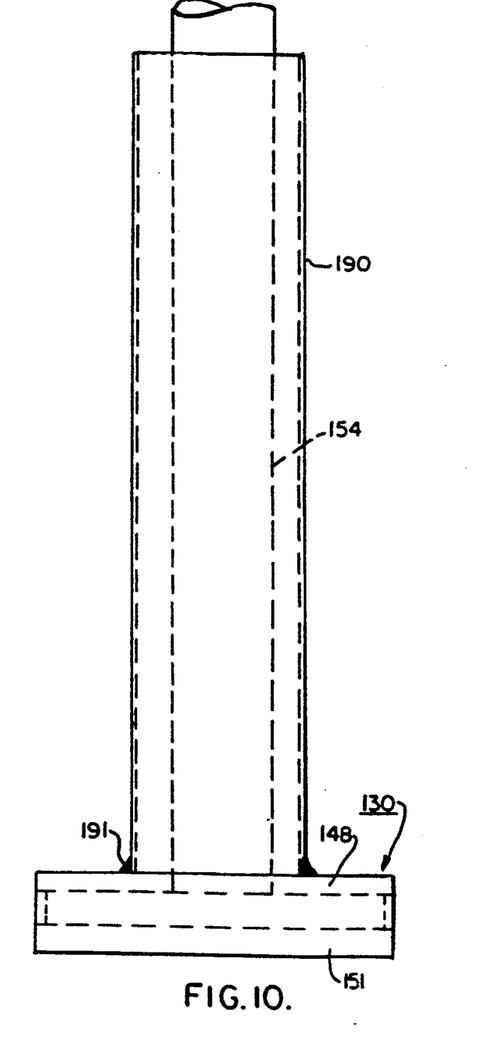
FIG. 10 is a like fragmental view in side elevation showing the lowermost filter unit and its supporting structure.
Figure 11:
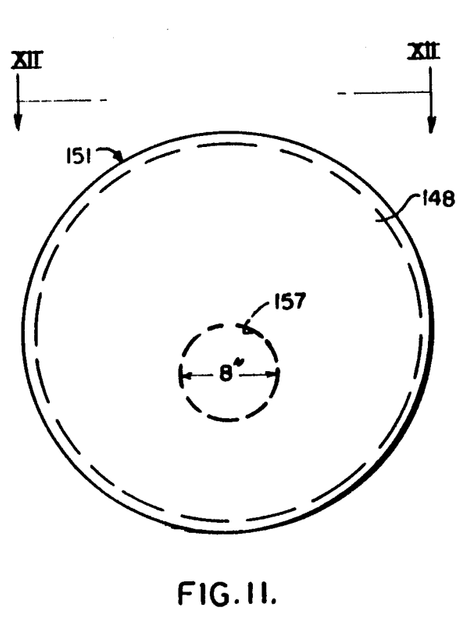
FIG. 11 is a plan view as viewed from the bottom of the lowermost filter clean-gas chamber.
Figure 12:
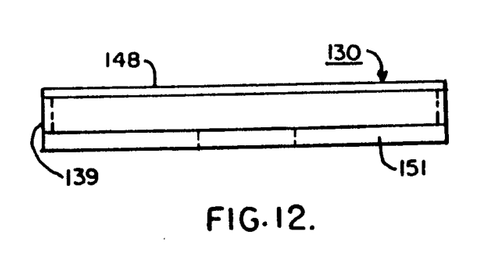
FIG. 12 is a view in side elevation taken in the direction of XII—XII of FIG. 11.
Figure 13:
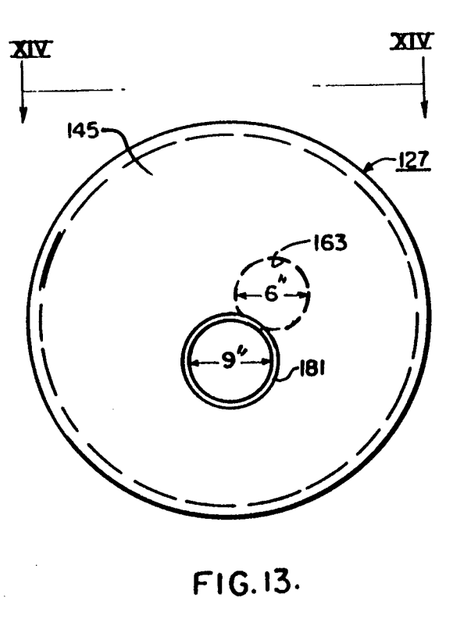
FIG. 13 is a plan view as viewed from the bottom of the central filter clean-gas chamber.
Figure 14:
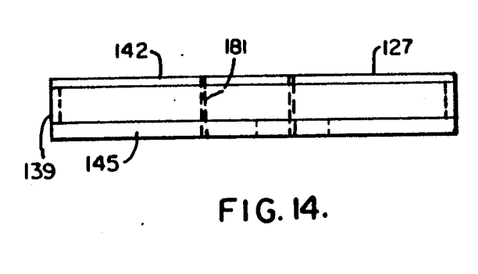
FIG. 14 is a view in side elevation taken in the direction XIV—XIV of FIG. 13.
Figure 15:
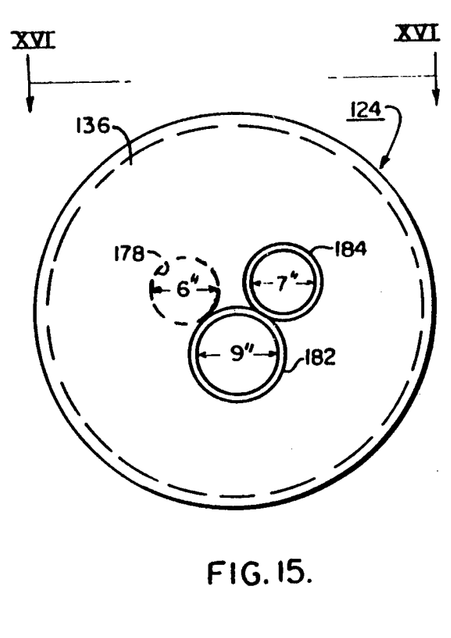
FIG. 15 is a plan view as viewed from the bottom of the uppermost filter clean-gas chamber.
Figure 16:
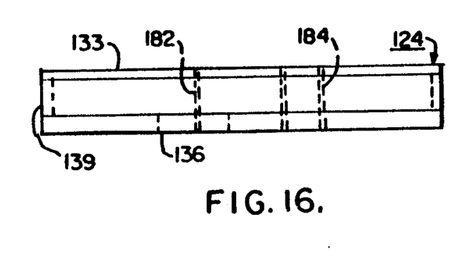
FIG. 16 is a view in side elevation taken in the direction XVI—XVI of FIG. 15.
Figure 17:
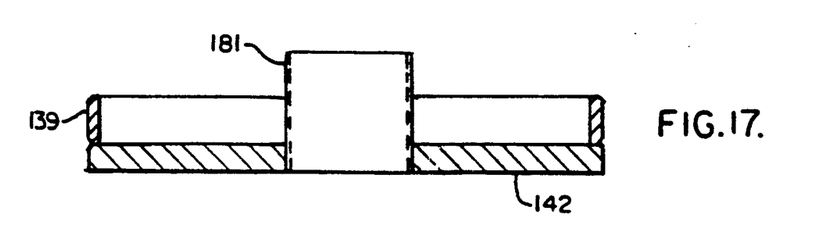
FIG. 17 is a view in longitudinal section showing the tube sheet, ring and sleeve of the filter clean-gas chamber shown in FIGS. 13 and 14.

The separation of the particulate is illustrated by the arrows 300 and 303 of FIG. 4. The solid arrows 300 represent the flow of the gas containing the particulate. The gas flows through the outer surfaces of the filter tubes 52 into the spaces 231 and 228 (FIG. 18). Since the particulate is absorbed in the pores of the filter tubes, the processed gas is substantially free of particulate as represented by the non-solid arrows 303. From the filter tubes the processed gas flows into the filter clean-gas chambers 130, 127 and 124 and thence into the enclosure 123 above the main tube sheet 100 through the tubes 154, 160 and 175, which, as stated above, open into the enclosure 123 (FIG. 1) above the main tube sheet 100. From the enclosure 123, the processed gas flows out through the nozzle 61.

Pulses of cleaning gas are transmitted through the tubes 78. A tube 78 is mounted coaxially with each tube 154, 160, 175 of each cluster 40. Through the tubes 154, 160, 175, the cleaning pulses flow into filter chambers 130, 127 and 130 respectively and from each chamber through the holes 228 and 231 (FIG. 18) in the filter tubes 52 to dislodge the particulate from the pores and to deposit the particulate on the hopper (not shown) connected to opening 70 (FIG. 1). The particulate which is deposited on the hoods 212 also falls from the hoods into the hopper (not shown). The cleaning pulses flowing from the tubes 78 through the tubes 154, 160, 175 and the filter chambers 130, 127, 130 into the filter tubes 52 are represented by the non-solid arrows 306 in FIG. 4. The cleaning pulses carrying the dislodged particulate are represented by the solid arrows 309.

While a preferred embodiment of this invention is disclosed herein, many modifications thereof are feasible. This invention is not to be restricted except insofar as is necessitated by the spirit of the prior art.

We claim:

1. Filtering apparatus for separating particulate from a gas stream including a vessel, gas-stream inlet means connected to said vessel, outlet means connected to said vessel for discharging the gas processed by said filtering apparatus, a tube sheet connected to said vessel, separating said outlet means from said inlet means, at least one cluster for removing particulate from said gas, said cluster including a plurality of filter units, each said filter unit including an array of filter tubes and a filter clean-gas chamber, each tube having an open end and a closed end, means connecting each tube of a said filter unit at its open end to, and in communication with, said filter clean-gas chamber of said last-named filter unit, means, connected to said cluster and to said tube sheet, for mounting said cluster with said filter units extending from said tube sheet in succession longitudinally of said vessel with said filter tubes including said closed ends in gas-stream filtering communication with said inlet means, and a separate conductor associated with each said filter unit of each array separate from said mounting means, connected to the filter clean-gas chamber of said associated filter unit of each array and to said tube sheet with said filter tubes in communication with said outlet means through said filter clean-gas chambers and through said tube sheet for conducting gas processed by said each array to be discharged by said outlet means.

2. The filtering apparatus of claim 1 wherein the tube sheet (herein "main tube sheet") extends transversely across the vessel dividing said vessel longitudinally into an inlet enclosure connected to the inlet means and an outlet enclosure connected to the outlet means and wherein the filter clean-gas chamber of each filter unit of each particulate-removing cluster is defined by a plate and an additional tube sheet (herein "auxiliary tube sheet") spaced from said plate, the filter tubes of each filter unit being suspended from the auxiliary tube sheet of said each said filter chamber in communication with the filter chamber of each said unit, each said cluster also including means, connected to said main tube sheet and to said each said cluster, for suspending said each said cluster with said filter units of said each said cluster extending vertically in succession, and a particle-deflecting hood for each of certain of said filter unit mounted on the plate defining the filter chamber of said each said certain filter units and having the shape of the frustrum of a cone whose surface is at an angle to the horizontal greater than the angle of internal friction.

3. The filtering apparatus of claim 1 including supporting-sleeve means for the conductor spaced along the vessel.

4. The filtering apparatus of claim 1 wherein the conductor of each filter unit is linear and is mounted generally parallel to the filter tubes.

5. The filtering apparatus of claim 2 including means, connected to said vessel and to the separate conductor of each filter unit, for transmitting cleaning gas coaxially along said each separate conductor.

6. The filtering apparatus of claim 1 wherein each filter clean-gas chamber of each filter unit of the cluster is defined by a plate and an additional tube sheet joined to the plate and the filter tubes of each filter unit are suspended from the additional tube sheet in communication with the filter clean-gas chamber.

7. The filtering apparatus of claim 6 wherein the tube sheet separating the outlet means from the inlet means (herein "main tube sheet") extends transversely across the vessel, dividing the vessel longitudinally into a first enclosure and a second enclosure, the gas-stream-inlet means being connected to the first enclosure and the outlet means being connected to the second enclosure, and the cluster is formed into a physically integrated unit by intermediate tubular members connecting each additional tube sheet (herein "auxiliary tube sheet") of the succession of filter units to a plate of the filter clean-gas chamber of the next filter unit longitudinally of the main tube sheet in the succession, and a suspending tubular member connecting the plate of the filter unit nearest the main tube sheet in the succession suspending the cluster in said second enclosure from said main tube sheet, the conductors of the processed gas passing through the intermediate tubular members and the main tubular member and being connected in communication with the second enclosure through the main tube sheet.

8. The filtering apparatus of claim 1 wherein each filter clean-gas chamber or each filter unit is defined by a plate and a tube sheet and the conductor for each filter unit is connected to the plate of, and in communication with, the filter clean-gas chamber of said each filter unit connecting said last-named filter clean-gas chamber in communication with the outlet means through the tube sheet.

9. The apparatus of claim 8 wherein the conductor from the filter chamber most remote from the mounting means is of greater cross sectional area than the conductors from the other filter chambers.

10. The filtering apparatus of claim 8 including an additional conductor connected generally coaxial with each processed-gas-conducting conductor for transmitting a cleaning gas through said each processed-gas-conducting conductor into the filter chamber with which said each processed-gas-conducting conductor is in communication and through the internal volume of the filter tubes suspended from the tube sheet defining said last-named chamber.

11. Filtering apparatus for separating particulate from a gas stream including a vessel, gas-stream inlet means connected to said vessel, outlet means connected to said vessel for discharging the gas processed by said filtering apparatus, a generally horizontal tube sheet separating said inlet means from said outlet means, a plurality of clusters for removing particulate from said gas, each said particulate-removing cluster including a plurality of filter units, each said filter unit including an array of filter tubes, each filter tube having an open end and a closed end, separate means, connected to each said cluster and to said tube sheet, for mounting said each said cluster with said filter units extending in succession from said tube sheet vertically in said vessel with said filter tubes including said closed end in gas-stream filtering communication with said inlet means, means, connected to each said filter unit and to said tube sheet, for conducting the gas processed by said each said filter unit through said open ends to said outlet means, and a particle-deflecting hood mounted vertically over at least some of said filter units, said hood having a particulate deflecting surface for receiving from said gas stream particulate to be deflected, said surface being inclined to the horizontal at an angle greater than the angle of internal friction for said particulate.

12. A filtering apparatus for removing particulate from a gas stream, said filtering apparatus including a vessel having a main tube sheet dividing the vessel into an inlet enclosure and an outlet enclosure; a cluster for removing particulate including: a plurality of filter units, each filter unit including:
 (a) a filter clean-gas chamber defined by a plate and an auxiliary tube sheet spaced from said plate,
 (b) an array of filter tubes, each tube having an open end and a closed end, suspending from said auxiliary tube sheet connected in communication through said open end with said filter clean-gas chamber, and
 (c) a separate conductor associated with each said filter unit connected to said plate of the associated filter unit, in communication with said filter clean-gas chamber of said associated filter unit for conducting away gas processed by said each filter unit, said cluster also including means for forming said filter units into an integrated physical structure in which said filter units extend in succession, said forming means including a tubular member between each successive pair of filter units in the succession, connected to the plate of one filter unit of said pair and to the auxiliary tube sheet of the other filter unit of the pair, and each cluster also including another tubular member connected to the plate of a filter unit of the succession nearest said main tube sheet and means, on said other tubular member, for suspending said cluster from said main tube sheet, said conductors passing through said tubular members.

13. The filtering apparatus of claim 12 including sleeve-supporting means for the conductors of at least some of the filter units, the sleeve-supporting means for each conductor extending from a filter unit remote from the main tube sheet being connected to and supported by filter units nearer the main tube sheet.

14. Filtering apparatus for separating particulate from a gas stream; said filtering apparatus including a vessel positioned with its longitudinal dimension generally vertical, a main tube sheet extending generally horizontally across the transverse dimension of said vessel dividing said vessel into an upper enclosure extending to the upper end of said vessel and a lower enclosure extending to the lower end of said vessel, a plurality of particulate-removing clusters within said lower enclosure, each of said clusters including a plurality of filter units, each of said filter units including:
 (a) a filter clean-gas chamber defined by a plate and an auxiliary tube sheet connected to said plate spaced therefrom,
 (b) a plurality of filter tubes suspended from said auxiliary tube sheet, each filter tube having an open end and a closed end, and
 (c) a separate gas conductor extending from, and connected in processed-gas communication with, the filter clean-gas chamber of each filter unit through the open end of each filter tube, and also connected to said main tube sheet in processed-gas communication with said upper enclosure;

means, connected to said main tube sheet, mounting each said cluster with said filter units spaced generally vertically along said lower enclosure, with the auxiliary tube sheet of each filter unit generally horizontal and with said filter tubes of each filter unit generally vertical; said mounting means including an upper member connecting the plate of the upper of said filter units to the main tube sheet and successive lower members each connecting a tube sheet of an upper filter unit to the plate of the succeeding lower filter unit; sleeve means, connected to the filter clean-gas chambers of the filter units above the unit with whose filter chamber each said separate conductor is in gas communication, for supporting said each said separate conductor; a particulate-deflecting hood mounted above at least some of said plates of said filter clean-gas chambers, each said particulate-deflecting hood having a deflecting surface to receive from said gas stream particulate to be separated, said surface being inclined to the horizontal at an angle greater than the angle of internal friction for the particulate; a cleaning tube connected in communication with each said gas conductor coaxially with each said gas conductor; means, connected to said lower enclosure, for supplying to said lower enclosure a gas stream from which particulate is to be separated; gas-stream deflecting means within said lower enclosure in communication with said supplying means to distribute the gas stream so that it is in particulate-deliver relationship with the outer surfaces of said filter tubes of said units including the closed end of each filter tube, and means, connected to said upper enclosure, for conducting away the gas processed by said filter units.

15. Filtering apparatus for separating particulate from a gas stream including a vessel, a main tube sheet extending across the transverse dimension of said vessel and dividing said vessel longitudinally into a first enclosure and a second enclosure; a plurality of filter clusters, a member supporting each said cluster from said main tube sheet, said supporting member extending from said tube sheet into said second enclosure and supporting said each said cluster so that it extends into said second enclosure longitudinally of said vessel, each said cluster including a plurality of filter units, each unit including:
 (a) a filter clean-gas chamber defined by a plate on one side and an auxiliary tube sheet spaced longitudinally of said vessel from said plate on the opposite side connected gas tight to said plate,
 (b) a tube communicating between said filter clean-gas chamber and said first enclosure, said tube being sealed gas tight to said plate and extending longitudinally of said vessel within said supporting member and being sealed gas tight to said main tube sheet, and
 (c) an array of elongated filter tubes suspended from said auxiliary tube sheet sealed gas tight to said tube sheet in communication with said filter clean-gas chamber, each tube having an open end and a closed end and being sealed with its communication with said filter clean-gas chamber through said open end; said filter units being spaced longitudinally of said vessel by members centrally connected between an auxiliary tube sheet of a filter unit nearer said main tube sheet and the plate of the filter clean-gas chamber next more remote from said main tube sheet, means, connected to said second enclosure, for transmitting said gas stream to said second enclosure; a shroud in said second enclosure in communication with said gas-streamtransmitting means, for deflecting the gas transmitted by said transmitting means through said clusters in particulate-depositing relationship with the filter tubes of each of said filter units; and means, connected to said first enclosure, for discharging the filtered gas.

16. Filtering apparatus for separating particulate from a gas stream; said filtering apparatus including: a vertical vessel, a substantially horizontal main tube sheet of substantial area dividing said vessel into an inlet enclosure and an outlet enclosure, a plurality of clusters, for processing said gas stream to separate particulate from the gas stream suspended from said main tube sheet in said inlet enclosure, each said cluster including a plurality of filter units aligned vertically, each filter unit including a plurality of filter tubes suspended from an auxiliary tube sheet, each said auxiliary tube sheet being of substantially smaller area than said main tube sheet, each filter unit also including means, connected to the filter tubes of said last-named filter unit and including the auxiliary tube sheet of said last-named filter unit for receiving only the gas processed by the filter tubes of said last-named filter unit, and means, connected to said receiving means and to said main tube sheet, for connecting said filter units in processed-gas-communication with said outlet enclosure.

17. The apparatus of claim 16 wherein the receiving means is a filter clean-gas chamber defined between a plate and the corresponding auxiliary tube sheet of said receiving means, the filter tubes being in processed-gas communication with said filter clean-gas chamber through said auxiliary tube sheet, and the connecting means includes means, connected to each filter clean-gas chamber and to the main tube sheet, for connecting the filter tubes in processed-gas communication with the outlet enclosure through said each filter clean-gas chamber.

* * * * *